United States Patent
Thangaraj

(10) Patent No.: US 11,170,562 B2
(45) Date of Patent: Nov. 9, 2021

(54) METHOD OF REPRESENTING SHAPE AND COLOR DATA OF 3-D OBJECTS

(71) Applicant: Karthikeyan Thangaraj, Chennai (IN)

(72) Inventor: Karthikeyan Thangaraj, Chennai (IN)

(73) Assignee: Karthikeyan Thangaraj, Chennai (IN)

(*) Notice: Subject to any disclaimer, the term of this patent is extended or adjusted under 35 U.S.C. 154(b) by 40 days.

(21) Appl. No.: 16/751,207

(22) Filed: Jan. 24, 2020

(65) Prior Publication Data
US 2020/0193693 A1 Jun. 18, 2020

Related U.S. Application Data

(63) Continuation-in-part of application No. PCT/IN2018/050466, filed on Jul. 17, 2018.

(30) Foreign Application Priority Data
Jul. 24, 2017 (IN) .............................. 201741026182

(51) Int. Cl.
*G06T 9/00* (2006.01)
*G06T 15/20* (2011.01)
*G06T 19/20* (2011.01)

(52) U.S. Cl.
CPC .............. *G06T 15/205* (2013.01); *G06T 9/00* (2013.01); *G06T 9/001* (2013.01); *G06T 19/20* (2013.01); *G06T 2215/16* (2013.01); *G06T 2219/004* (2013.01); *G06T 2219/2012* (2013.01)

(58) Field of Classification Search
None
See application file for complete search history.

(56) References Cited

U.S. PATENT DOCUMENTS

| 2008/0178246 A1* | 7/2008 | Blanchard | H04N 21/431 |
| | | | 725/131 |
| 2017/0270634 A1* | 9/2017 | Eggebrecht | G06T 15/04 |
| 2019/0236795 A1* | 8/2019 | Oryoji | H04N 5/247 |

* cited by examiner

*Primary Examiner* — Ryan McCulley
(74) *Attorney, Agent, or Firm* — Convergence Intellectual Property Law P.C.; Jonathan Garfinkel

(57) ABSTRACT

Method and system for generating a coded image format representing surface data of a 3-dimensional object is disclosed. The method includes superposing an imaginary spherical surface over the object based on a reference point within the object. The surface points of the front portion and back portion of the object are mapped to a first circular region and a second circular region. The distance information of the surface points of the front portion and the back portion from the reference point are encoded as greyscale values to obtain shape information. The color information of the surface points of the front portion and back portion of object are encoded as color values to obtain color information of the front portion and the back portion of the object. The encoded values are stored in pixels of raster graphics image. A coded image format is generated based on the raster graphics image.

22 Claims, 8 Drawing Sheets

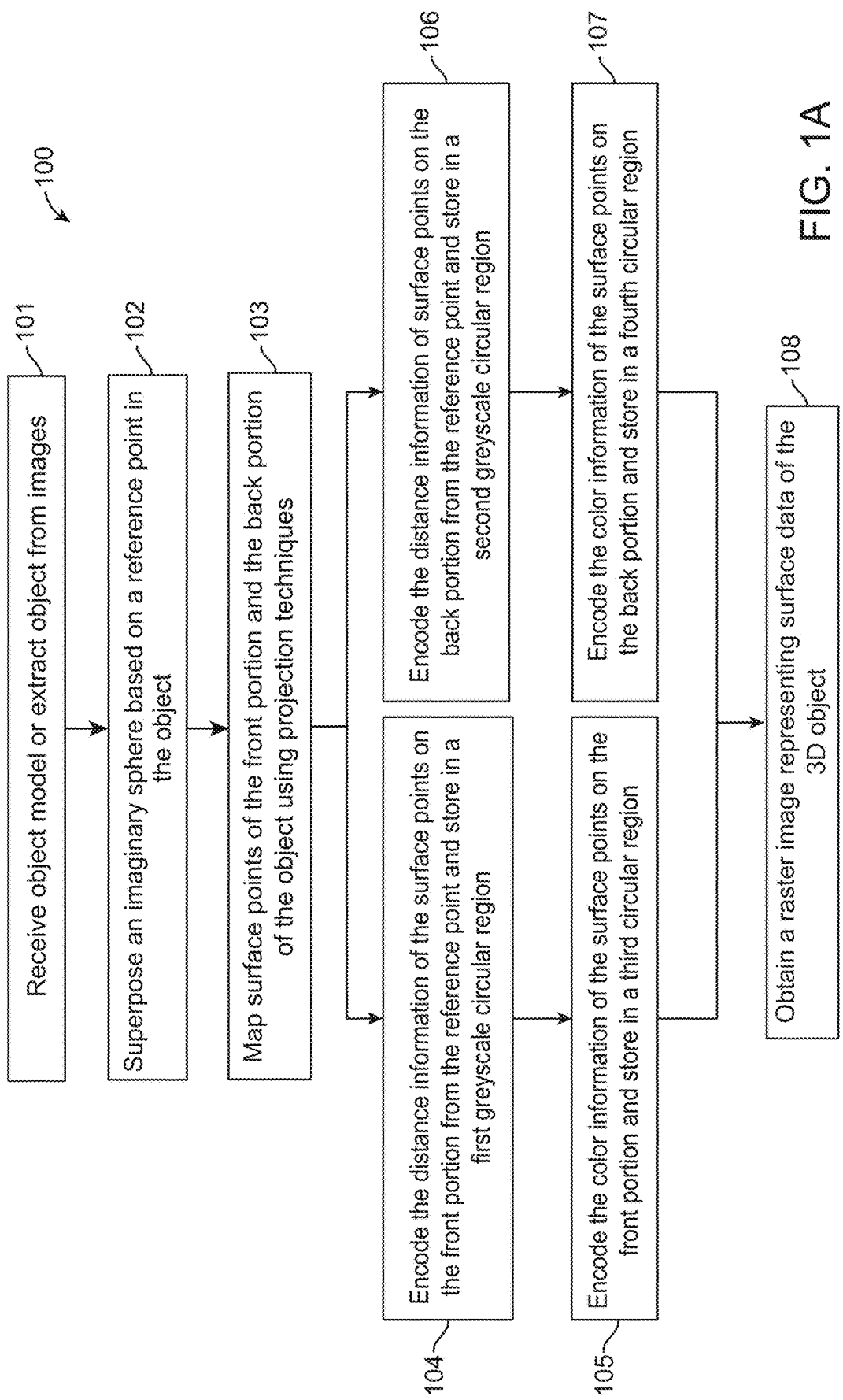

METHOD OF REPRESENTING SHAPE AND COLOR DATA OF 3-D OBJECTS

CROSS REFERENCE TO RELATED APPLICATIONS

This application is a continuation-in-part of PCT international application No. PCT/IN2018/050466 filed on Jul. 17, 2018, which claims priority to Indian patent Application No. 201741026182, titled "DIGITAL IMAGE CODING OF SHAPE AND COLOR DATA OF THE OUTER SURFACE OF 3-D OBJECTS", filed on Jul. 24, 2017, the full disclosures of the above referenced applications are incorporated herein by reference.

FIELD OF THE INVENTION

The disclosure relates generally to raster graphics syntax and, in particular, to systems, methods and devices for storing surface data of 3-D objects in a raster graphics image.

DESCRIPTION OF THE RELATED ART

Images are artifacts that convey information to a person visually. In the digital age, images have become an important and ubiquitous form of communication. Generally, images are static in nature and provide a two-dimensional view of a scene, which may include 3-dimensional objects. In order to appreciate and/or understand such an object, its surface information, such as color and shape, may need to be perceived by the human eye. However, surfaces of objects facing the camera alone are discernible to the viewer and the rest of the object is left to imagination.

In a typical photo shot of an object, only the color information of the surface facing the camera is captured. A single image does not enable a user to comprehend the true shape of the 3-dimensional object. Even multiple images from different angles may prove difficult or misleading to interpret when shape of the object is complex or unfamiliar to the viewer. Mental construction of the object based on several multi-view pictures could be challenging. Further, a video or sequence of picture shots taken at small angular intervals of a still object produces a seamless rotational view but it does not cover the complete solid angle. Also, a lot of redundant image information is carried between consecutive images and is an inefficient way of image data storage.

Various publications, such as U.S. Pat. No. 9,407,904 B2 disclose methods for creating 3D virtual reality from 2D images and providing images generated dynamically for the viewer in response to changes in the viewer's position and orientation in the virtual reality environment. US20120182293A1 discloses a method and arrangement for generating representations of anisotropic properties of crystals. However, they do not disclose providing an image or image format that depicts entire surface information of 3-dimensional objects.

Over the years, a number of image storage formats have been developed. For example, digital images in standardized file formats, such as jpg, tiff, bmp, etc., are important types of data communicated and searched. However, no image format provides complete surface information of a particular object through a single image.

Further, object simulations similar to those produced in computer-aided design and manufacturing applications are not useful in providing photographic images of real world objects. There is a dearth of image formats that depict a 3-dimensional object shape, size, and color. Further, there are no methods of providing images of object that contain information about the object from all possible angles. Therefore, there is a need for a method of digitizing the object images from all possible angles, which would be of immense value in information technology.

SUMMARY OF THE INVENTION

The present subject matter relates to methods and systems for storing surface data of a 3-dimensional object in a raster graphics image, and subsequent retrieval of virtual image of object from any view point.

According to one embodiment of the present subject matter, a method of generating coded image format representing surface data of a 3-dimensional object is provided. The method includes receiving a model or plurality of images of a 3-dimensional object. An imaginary spherical surface is superposed over the object based on a reference point within the object. The imaginary spherical surface includes a front pole point and a back pole point. The surface data of the object is captured through a solid angle discretization of the superimposed imaginary sphere. The surface points of a front portion of the object are mapped using projection from the back pole point to form a first circular region at a tangent plane drawn at the front pole point. The front portion of the object is in the first hemisphere of the imaginary spherical surface. The surface points of a back portion of the object are mapped using projection from the front pole point to form a second circular region at a tangent plane drawn at the back pole point. The back portion of the object is in the second hemisphere of the imaginary spherical surface. The distance information of the surface points of the front portion and the back portion of the object from the reference point are encoded as greyscale values to denote shape information of the front portion and back portion of the object. The encoded values are stored in the pixels of the first circular region and second circular region to form a first greyscale circular region and a second greyscale circular region in the raster graphics image. The color information of the corresponding surface points of the front portion and the back portion of the object are encoded as color values to obtain color information of the front portion and the back portion of the object. The encoded color values are stored in the pixels of a third circular region and fourth circular region in the raster graphics image. A coded image format is generated based on the raster graphics image, where the coded image format represents the surface data of the object. The coded image format includes the first greyscale circular region in a first location; the second greyscale circular region in a second location; the third circular region in a third location; he fourth circular region in a fourth location; and metadata in the regions outside the circular regions forming a white background.

In various embodiments, the method may include capturing a plurality of images of the 3-dimensional object at a plurality of orientations to obtain multiple views of the object, and processing the plurality of captured images by segmentation to extract a model of the object.

In various embodiments, the standard solid angle discretization of the superposed imaginary sphere includes $\pi N^2/8$ number of discretized surface points for a full size image of N×N pixels. The method may further include decoding the graphic raster image data file using a decoder application program to render the virtual image of the object from one or more viewing directions and at one or more viewing distances. The method of decoding may further include retrieving set of spherical triangle unit elements ($\pi N^2/4$) comprising circular zone point and its horizontal, vertical adjacent points. In the next step, the method includes forming the complete continuous envelope for linear or curvilinear interpolation of the surface. Subsequently, tracing surface data of the object to obtain virtual image.

In various embodiments, the method may further include encoding the distance information of each of the surface points of the front portion of the object from the reference point as a grey scale value or the back portion of the object from the reference point as a grey scale value performed by linear scaling. In various embodiments, the method may further include mapping the surface points of the front or the back portion of the object performed by a projection technique selected from stereographic projection or equal area projection.

In various embodiments, the method applies to 3D objects exhibiting non-transparent, non-specular outer surface, and a shape such that the line emanating from the reference point in any direction intersects the outer surface of the object at not more than one point. The method may further include recording the metadata of the object in pixels, the metadata comprising one or more of marker length, marker units, annotation about the objects, annotation labels, description of the object using ASCII conversion of text characters, image format version, encoding type, scale, or sequence of views of the object.

In various embodiments, the method includes rendering an image from the coded image format. The method includes receiving a raster graphics image comprising a first circular region, a second circular region, a third circular region, a fourth circular region, and a metadata region, wherein each region represents surface data of the object. The method, in the next steps, involves decoding pixels in the metadata region to retrieve metadata associated with at least one of the raster graphics image and the object. Then, pixels of the first circular region and the second circular region are decoded to obtain 3D coordinates of the surface points in an initial reference axis system, wherein the 3D coordinates comprises a distance information and vector coordinates of surface points from a reference point in the object. Subsequently, the method includes decoding pixels of the third and fourth circular region to obtain the RGB color information. In the next step, 3D coordinates of the surface points from the initial reference axis system are transformed to perspective 2D image coordinates and associated triangular surface elements of an output view. Pixel data attributes within triangular surface elements are calculated by interpolation and pixel color is updated based on distance information along the viewing direction to render the output view image.

According to another embodiment of the present subject matter, a system for generating coded image format representing surface data of a 3-dimensional object is provided. The system includes one or more image capturing devices configured to capture one or more images of the 3-dimensional object in different heights, angles and orientations; a memory unit; a processing unit coupled to the memory unit and configured to process the one or more captured images, and a display device configured to render a virtual image of the object viewable from one or more directions and one or more distances, characterized in that the processing unit is configured to: receive a model or a plurality of images of a 3-dimensional object. The processing unit superposes a spherical surface over the object based on a reference point within the object. The imaginary spherical surface includes a front pole point and a back pole point. The processing unit maps the surface points of the front portion of the object using projection from the back pole point to form a first circular region at a tangent plane drawn at front pole point. The front portion of the object is in a first hemisphere of the imaginary spherical surface. The surface points of the back portion of the object are also mapped using projection from the front pole point to form a second circular region at a tangent plane drawn at the back pole point. The back portion of the object is in a second hemisphere of the imaginary spherical surface. The distance information of the surface points of the front portion and the back portion of the object from the reference point are encoded as greyscale values to obtain shape information of the front portion and back portion of the object. The encoded values are stored in the pixels of the first circular region and second circular region to form a first greyscale circular region and a second greyscale circular region in the raster graphics image. The color information of the corresponding surface points of the front portion and the back portion of the object are encoded as color values to obtain color information of the front portion and the back portion of the object. The encoded color values are stored in the pixels of a third circular region and fourth circular region in the raster graphics image. A coded image format is generated based on the raster graphics image, where the coded image includes the first greyscale circular region in a first location; the second greyscale circular region in a second location; the third circular region in a third location; the fourth circular region in a fourth location; and metadata in the regions outside the circular regions forming a white background.

In various embodiments, the processing unit may be further configured to read the raster graphics image data file using a decoder application program to render the virtual image of the object from one or more viewing directions and at one or more viewing distances. In some embodiments, the system includes a display device configured to render a virtual image of the object viewable from one or more directions and one or more distances. The distance information of each of the surface points of the front portion of the object from the reference point or the back portion of the object from the reference point is encoded as a grey scale value by linear scaling. The surface points of the front portion or back portion of the object is mapped by a projection technique selected from stereographic projection, lambert projection or equal area projection The processing unit may be further configured to record the metadata of the object comprising one or more of marker length, marker units, annotation marks, annotation labels, description of the object using ASCII conversion of text characters and store the grey pixel value.

In various embodiments, the image capturing device is configured to capture a plurality of images of a 3-dimensional object. In some embodiments, the processing unit is configured to process the plurality of captured images to extract objects.

According to another embodiment, a computer program product having non-volatile memory therein, carrying computer executable instructions stored therein for generating a coded raster graphics image format representing surface data of a 3-dimensional object is provided. The instructions include receiving a model or plurality of images of a 3-dimensional object to construct the model. The instructions include superposing an imaginary spherical surface over the object based on a reference point within the object. The imaginary spherical surface includes a front pole point and a back pole point. The instructions include mapping surface points of a front portion of the object using projection from the back pole point to form a first circular region at a tangent plane drawn at the front pole point. The front portion of the object is in a first hemisphere of the imaginary spherical surface. The surface points of a back portion of the object are mapped using projection from the front pole point to form a second circular region at a tangent plane drawn at the back pole point. The back portion of the object is in a second hemisphere of the imaginary spherical surface. The instructions further include encoding distance information of the surface points of the front portion and the back portion of the object from the reference point as greyscale values to obtain shape information of the front portion and back portion of the object. The encoded values are stored in the pixels of the first circular region and second circular region to form a first greyscale circular region and a second greyscale circular region in the raster graphics image. The color information of the corresponding surface points of the front portion and the back portion of the object are encoded as color values to obtain color information of the front portion and the back portion of the object. The encoded color values are stored in the pixels of a third circular region and fourth circular region in the raster graphics image. A coded image format is generated based on the raster graphics image, where the coded image format represents the surface data of the object.

According to another embodiment, a computer program product having non-volatile memory therein, carrying computer executable instructions stored thereon for causing a device with a processor to read a coded image format representing surface data of a 3-dimensional object and render the object, is provided. The instructions cause the processor to receive a raster graphics image comprising a first circular region, a second circular region, a third circular region, a fourth circular region, and a metadata region, wherein each region represents surface data of the object. The instructions are further for decoding pixels in the metadata region to retrieve metadata associated with at least one of the raster graphics image and the object. The instructions further include decoding pixels of the first circular region and the second circular region to obtain 3D coordinates of the surface points in an initial reference axis system, wherein the 3D coordinates comprises a distance information and vector coordinates of surface points from a reference point in the object. Further, the instructions include decoding pixels of the third and fourth circular region to obtain the RGB color information. The instructions further cause transforming 3D coordinates of the surface points from the initial reference axis system to perspective 2D image coordinates and associated triangular surface elements of an output view. The instructions then cause calculating pixel data attributes within triangular surface elements by interpolation and updating pixel color based on distance information along the viewing direction to render the output view image.

In various embodiments, the coded image format comprises: the first greyscale circular region in a first location; the second greyscale circular region in a second location; the third circular region in a third location; the fourth circular region in a fourth location; and metadata in the regions outside the circular regions forming a white background.

According to another embodiment of the present subject matter, a method of representing surface data of a 3-dimensional object in raster graphic images is provided. The method includes receiving an overall shape information and an overall color information of surface points of a 3-dimensional object. The next step in the method includes encoding the shape information of the object as greyscale values. Further, the method includes encoding the color information of the surface points of the object as color values. Subsequently, the method includes storing the greyscale values in pixels of a first circular region and a second circular region to form a first greyscale circular region and a second greyscale circular region in the raster graphics image. Finally, the method includes storing the color values in pixels of a third circular region and a fourth circular region in the raster graphics image.

In various embodiments, the method also includes receiving metadata associated with the object and the raster graphics image. The method further includes storing the metadata in pixels outside the circular regions in the raster graphics image.

This and other aspects are disclosed herein.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 1A illustrates a method of generating a coded image format representing surface data of a 3-dimensional object, according to an embodiment of the present subject matter.

DETAILED DESCRIPTION

Figure 1B:
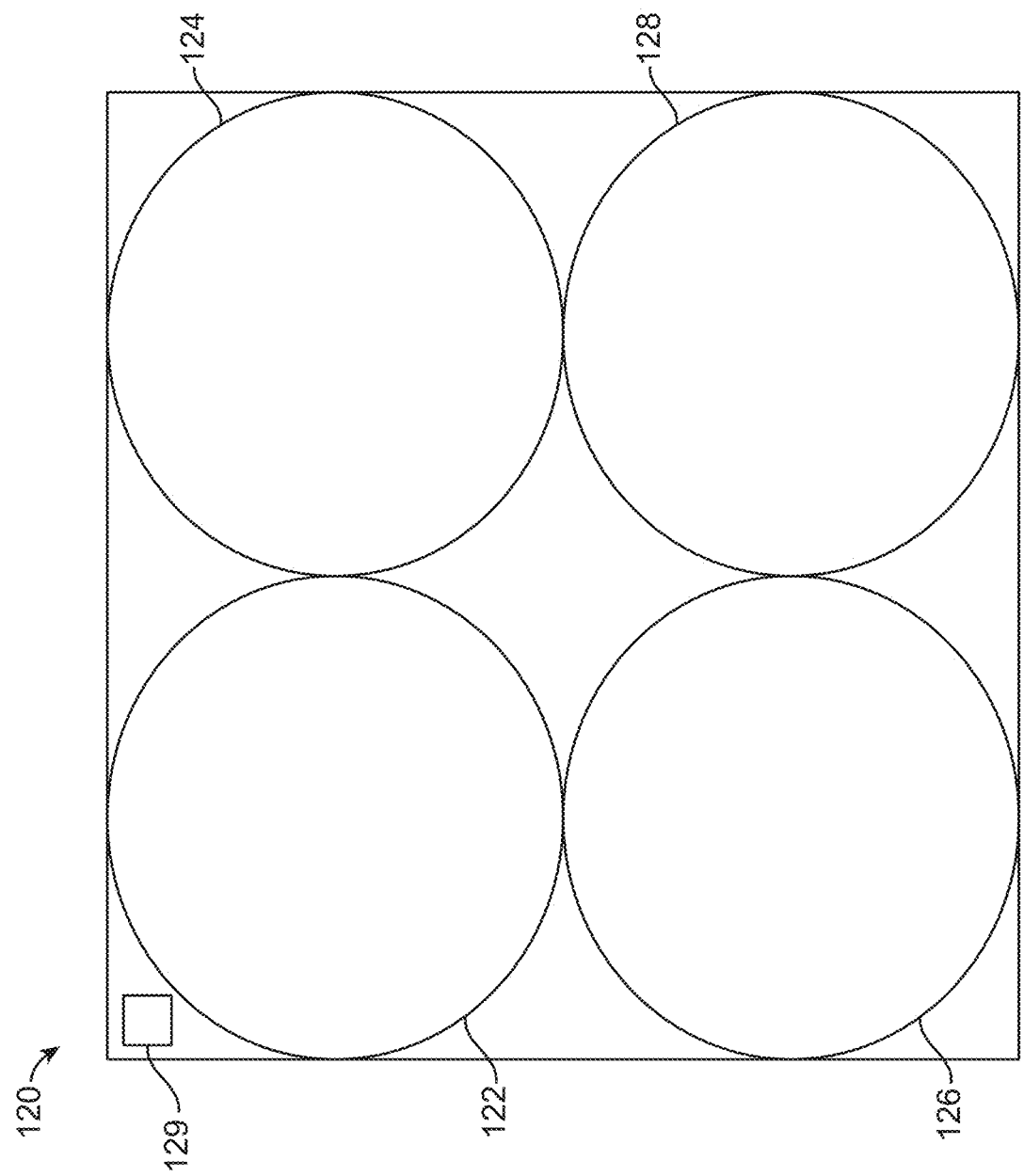
FIG. 1B illustrates a raster graphics image, according to an embodiment of the present subject matter.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The invention in its various embodiments proposes methods and systems for digital image coding of shape and color data of surface of 3-dimensional objects by storing the surface data in a raster graphics image. The present subject matter further includes a method and system of rendering an image of a 3-dimensional object from any viewing direction and from any distance.

A method of generating coded image format representing surface data of 3-dimensional objects is illustrated in a flow chart as shown in FIG. 1A, according to one embodiment of the present subject matter. The method in various embodiments includes receiving object model or extracting objects from images at block 101. The object may in some embodiments be a regular object such as a cube, cuboid, sphere, hemisphere, etc. In other embodiments the object may have irregular shape. The object may be such that there is at least one point within the object from which any emanating ray intersects the outer surface at only one point. In various embodiments, a plurality of images of the object may be captured at different angles and orientations such that all spatial orientations are covered. The plurality of captured images may be processed to extract the foreground of the images. The foreground of the images may include the 3-dimensional object. In some embodiments, the processing may include image segmentation. In some other embodiments, an object model may be constructed using the plurality of captured images for further processing.

In various embodiments, the method is illustrated in a number of steps as discussed further. In the first step, an imaginary or abstract spherical surface is superposed over the object based on a reference point within the object at block 102. The imaginary spherical surface may include a front pole point and a back pole point. The surface points of the front portion of the object and the back portion of the object may be mapped using projection techniques at block 103. The front portion of object may be in a first hemisphere of the imaginary sphere and the back portion of object may be in a second hemisphere of the imaginary sphere. The mapping of the surface points of the front portion of the object is done from the back pole point. Similarly, the mapping of the surface points of the back portion of the object is done from the front pole point. Based on the mapping a first circular region and a second circular region are formed at a tangent plane drawn at the front pole point and the back pole point. In various embodiments, the projection techniques may include one of stereographic projection, lambert projection, equal area projection, or other projections as known in the art. In some embodiments, the projection used is equal area projection to map the surface at uniform solid angle intervals. Particularly, in equal area projection the sampling may map a surface point located at a polar angle ($\alpha$) and an azimuthal angle ($\beta$) from projection center proportional to $(1-\cos \alpha)(\cos \beta, \sin \beta)$ coordinates in the circular zone.

The distance information of surface points on the front portion of the object with respect to the reference point are encoded as a greyscale value and stored in a first greyscale circular region of the raster graphics image at block 104. The greyscale values indicate the shape information of the front portion of the object. The color information of the surface points on the front portion of the object are encoded as color values and stored in a third circular region of the raster graphics image at block 105. Similarly, distance information of surface points of the back portion from the reference point are encoded as a greyscale value and stored in a second greyscale circular region of the raster graphics image at block 106. The color information of the surface points on the back portion of the object are encoded as color values and stored in a fourth circular region of the raster graphics image at block 107. A coded image format is generated based on the raster graphics image at block 108. The coded image format represents the surface data of the object, i.e., the shape and color information of the object.

In some embodiments, metadata may be recorded in pixels outside the circular regions. The metadata may include one or more of marker length, marker units, annotation marks, annotation labels, description of object using ASCII conversion of text characters, image format version, type of encoding/decoding, scale, sequence of view of the object, kind of spherical projection utilized, etc.

In one embodiment, the invention provides a representation of shape and color information of a 3D object as a raster image, as illustrated in FIG. 1B. As illustrated in the figure, the image 120 may comprise 4 regions and a surrounding region within the raster image. The first grayscale region 122 and the second grayscale region 124 may store representations of the shape of front portion and back portion of the 3D object. The third circular region 126 and the fourth circular region 128 may store color representations of the surface of the 3D object corresponding to the front and the back portions. The raster image in portion 129 may include metadata relating to the 3D object, including marker length, marker units, annotation marks, annotation labels, description of object using ASCII conversion of text characters, image format version, type of encoding/decoding, scale, sequence of view of the object, kind of spherical projection utilized, etc.

Figure 2:
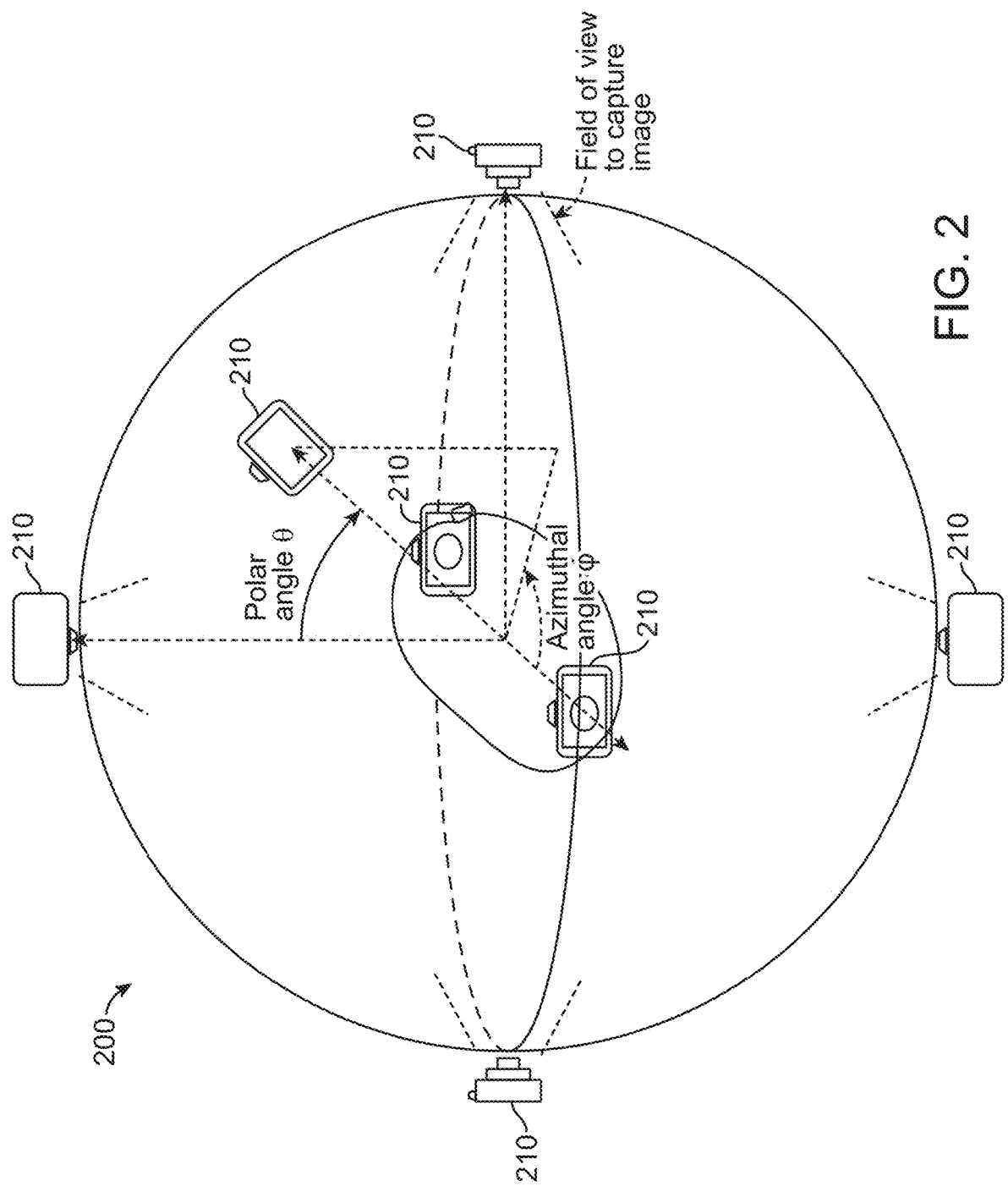
FIG. 2 illustrates a simplified diagram of a system capturing images of a real object, according to an embodiment of the present subject matter.
Figure 3:
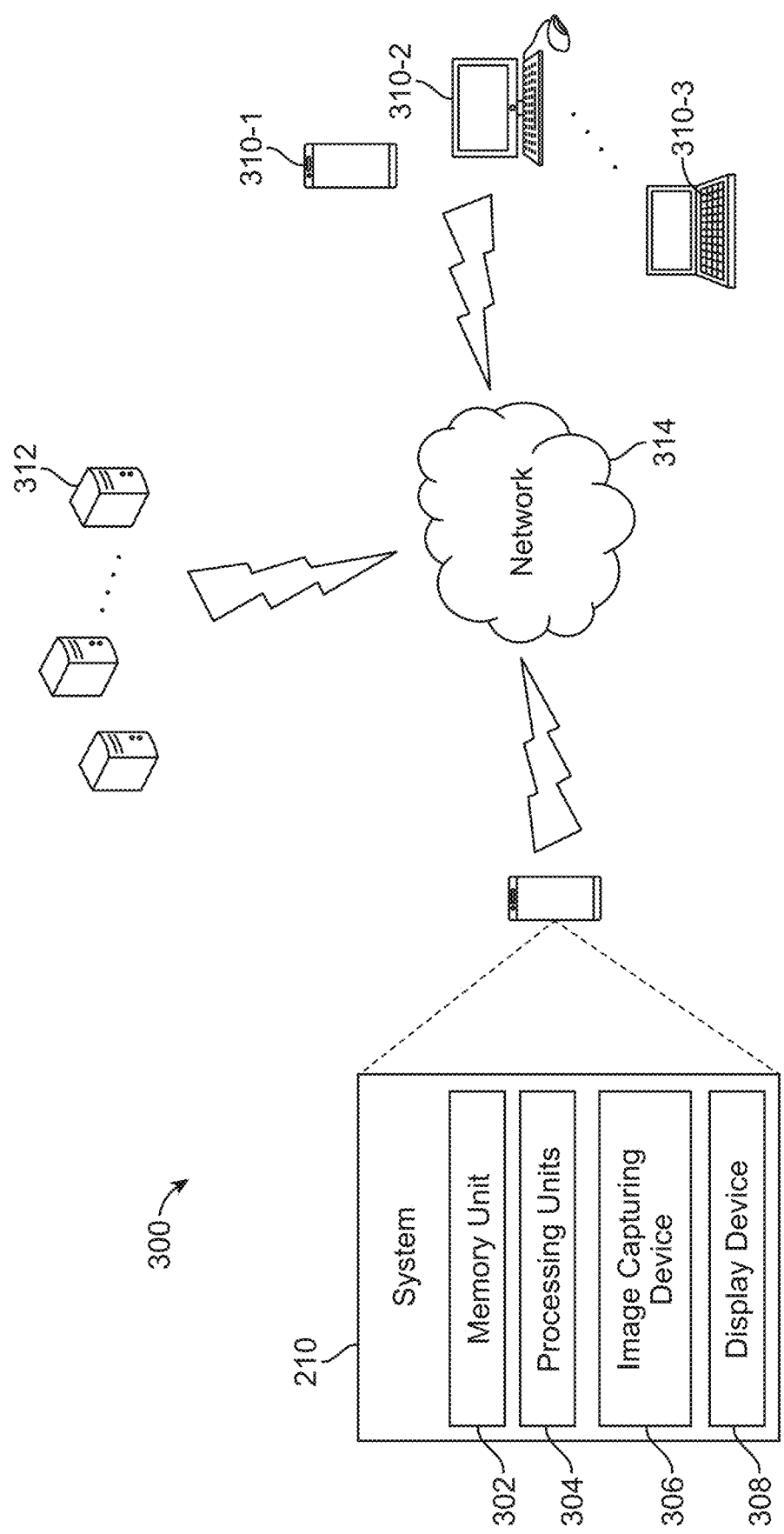
FIG. 3 illustrates a simplified diagram of a system capable of generating coded image format and communicating over a network, according to an embodiment of the present subject matter.

A schematic diagram of a system configured for capturing images of a real object is illustrated in FIG. 2, according to an embodiment of the present subject matter. In various embodiments, the system 210 may be capable of capturing images and generating coded image format representing the surface data of the objects. The system 210 may include a memory unit 302, processing unit 304, image capturing device 306, and display device 308, as shown in FIG. 3. The image capturing device 306 of the system may be used to capture images at a plurality of orientations and angles to obtain multiple views of the object O.

In various embodiments, the system may be mounted on a stand for capturing different views of the object. The stand may include one or more circular members connected in a hinged arrangement for adjusting the polar or azimuthal angular positions of the system. The object O may be positioned at the centre of the circular member and the image capturing device 306 of the system may capture a plurality of orientations and angles to obtain multiple views of the object O. In some embodiments, the stand may include a mechanism to navigate the system 210 around the object O. In some embodiments, the image capturing device 306 is configured to capture images of the object to cover three dimensional surface area of the object. In some examples, at least six images representing different views of the object may be captured and processed by the system 210 for generating the coded image format.

The processing unit 304 is configured to process the captured images of the object O to extract the object from the images. In some embodiments, the processing may include image segmentation, background compensation, and any of the various techniques as known in the art. For example, the object may be segmented using a graph partitioning method such as normalized cuts, random walker, minimum cut, graph cut, etc. Further, the processing unit 304 superposes a spherical surface over the object based on a reference point within the object. The object shape is taken to be a large sphere to start with, and it is sculpted down using the 2D shape information from the images. Techniques based on ray tracing geometry and pattern matching may be utilized in deducing the object model in the spherical coordinate system. The shape, size detail of the object may also be directly retrieved from any available physical model (such as STL formats). After modeling of the shape, the color detail of the object photographs may be stitched to the spherical surface elements of the object.

The imaginary spherical surface includes a front pole point and a back pole point. The processing unit 304 maps the surface points of the front portion of the object using projection from the back pole point to form a first circular region at a tangent plane located at the front pole point. The surface points of the back portion of the object are also mapped using projection from the front pole point to form a second circular region at a tangent plane drawn at the back pole point. The processing unit 304 encodes distance information of the surface points of the front portion and the back portion of the object from the reference point as greyscale values to obtain shape information of the front portion and back portion of the object. The encoded values are stored in the pixels of the first circular region and the second circular region to form a first greyscale circular region and a second greyscale circular region in the raster graphics image. Further, the processing unit 304 encodes the color information of the surface points of the front portion and the back portion of the object as color values. The encoded color values are stored in the pixels of a third circular region and fourth circular region in the raster graphics image. The processing unit 304 then generates a coded image format based on the raster graphics image, where the coded image format represents the surface data of the object.

In various embodiments, the method may include capturing the surface data of the object through a standard solid angle discretization of the superposed imaginary sphere. In one embodiment, the number of discretized surface points may be $\pi N^2/8$ for a full size image of N×N pixels.

In various embodiments, the invention discloses a method of decoding and rendering an image from the coded image format produced using the method as disclosed with reference to FIGS. 1A and 1B. The processing units 304 may be configured to decode and render a virtual image of the object from one or more viewing directions and distances.

In some embodiments, the decoding may include retrieving set of spherical triangle unit elements ($\pi N^2/4$) comprising a circular zone point and corresponding horizontal, vertical adjacent points, forming the complete continuous envelope for linear or curvilinear interpolation of the surface, and tracing surface data of the object to obtain a virtual image. In some embodiments, a simulation of the object may be rendered, such that the simulation provides views of the object from all directions and distances. In some embodiments, the system 210 may include a user interface providing a plurality of view controls for simulating and displaying the virtual image of object. For example, the user controls may include options for changing rotation, translation, scaling, transparency, etc.

Further, the system 210 may communicate with a plurality of other devices 310-N, servers 312, databases 314 for sharing the digital image coded format of an object. The plurality of devices 310-N may include laptop computers, tablet computers, desktop computers, smartphones, personal digital assistants (PDA), smart devices, or the like. In some embodiments, the devices may be configured to utilize various communication protocols, such as Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, High Speed Packet Access (HSPA), Long Term Evolution (LTE), 5G, 5G-New Radio, and Worldwide Interoperability for Microwave Access (WiMAX).

The plurality of devices 310-N may be configured to execute a decoder application to render a virtual image of the object from one or more viewing positions. In various embodiments, the plurality of devices 310-N may be configured to render the image in a virtual environment, such as a virtual reality (VR) environment, augmented reality (AR) environment, and mixed reality (MR) environment. In some embodiments, the system 210 may store the coded image format of objects in a remote database 314 or cloud storage. The system may also upload the image coded formats at one or more servers 312. The servers 312 may facilitate platforms, such as social media platforms, instant messaging platforms, media sharing platforms, and the like. The plurality of devices 310-N may download the coded image format from the servers 312 running the various platforms for decoding.

Figure 4:
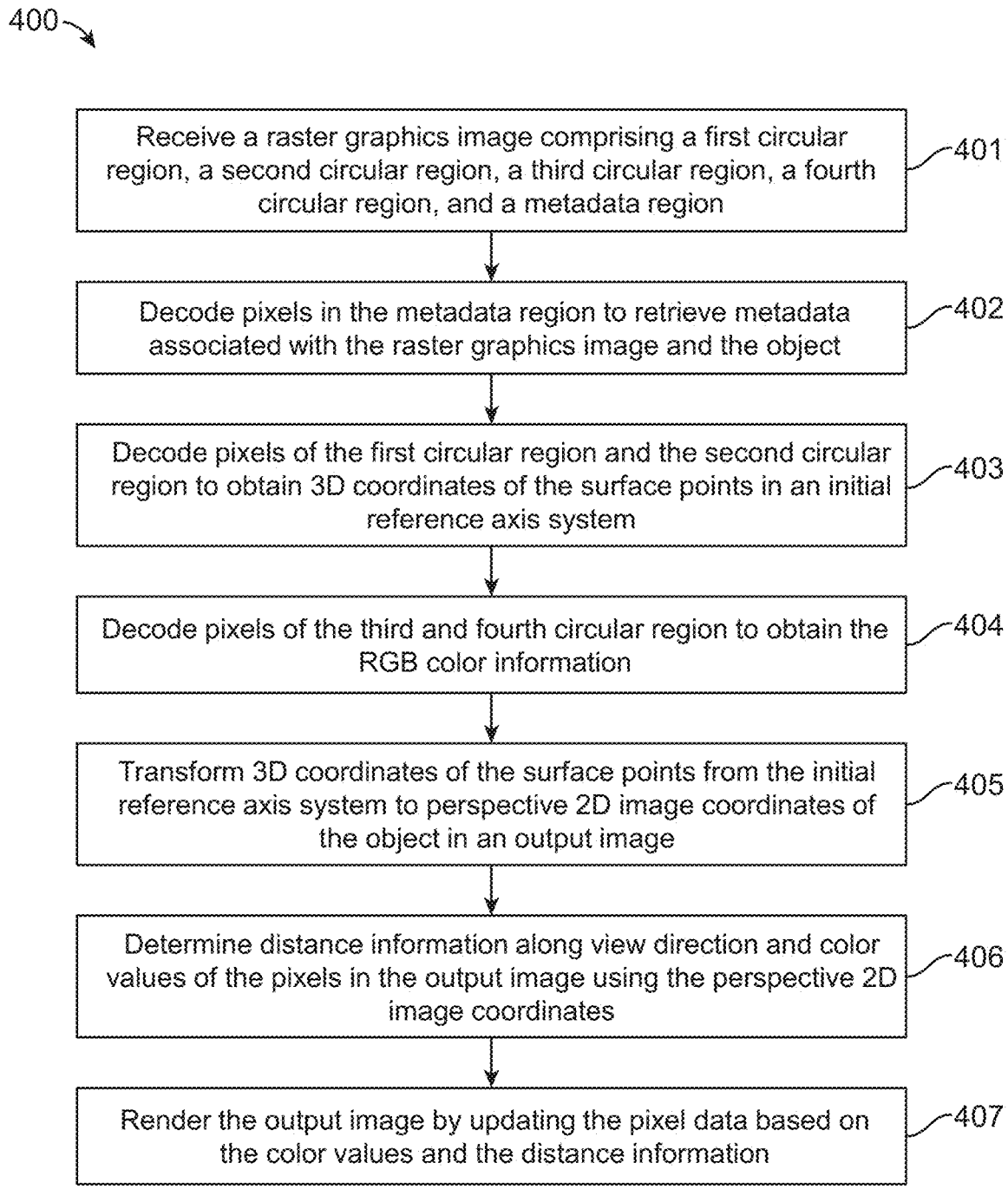
FIG. 4 illustrates a method for reading a coded image format representing surface data of a 3-dimensional object and rendering the object, according to an embodiment of the present subject matter.

A method for reading a coded image format representing surface data of a 3-dimensional object and rendering the object is illustrated in FIG. 4, according to an embodiment of the present subject matter. The method includes receiving a raster graphics image having a first circular region, a second circular region, a third circular region, a fourth circular region, and a metadata region at block 401. The first circular region and the second circular region may indicate the shape of the front portion and back portion of the object. The third circular region and the fourth circular region may indicate the color information of the front portion and the back portion of the object.

The pixels in the metadata region may be decoded to retrieve metadata associated with raster graphics image of the object at block 402. The metadata may include one or more of marker length, marker units, annotation about the objects, annotation labels, description of object using ASCII conversion of text characters, image format version, encoding type, scale, or sequence of views of the object.

The pixels of the first circular region and the second circular region may be decoded to obtain 3D coordinates of the surface points in an initial reference axis system at block 403. The 3D coordinates in cartesian and spherical coordinate systems are interpreted from the distance information and vector direction of surface points from the reference origin point of the object. Subsequently, the pixels of the third and fourth circular region may be decoded to obtain RGB color information at block 404.

In the next step, 3D coordinates of the surface points from the initial reference axis system are transformed to perspective 2D image coordinates of the view in an output image at block 405. Based on the perspective 2D image coordinates, distance information along view direction and color values of the pixels in the output image are determined at block 406. In various embodiments, the perspective 2D image coordinates of plurality of triangular surface elements in the output image may be calculated from corresponding spherical triangle unit elements in the raster graphics image. The spherical triangle unit elements may be composed of pixels and adjacent left/right and top/down pixel positions in the raster graphics image. A set of pixels within the triangular surface elements in the output image may be identified to determine distance along the view direction and plausible RGB color value by linear interpolation based on the triangle vertices data. Finally, the method includes rendering the output image by updating the pixel data based on the color values and the distance information at block 407. The color values of pixels of output image are updated from an initial background color, which may be white, based on the calculated interpolated color. In some embodiments, the pixels of the output image may be updated with a color based on a proximal view distance condition and surface transparency settings.

In various embodiments, the methods may be implemented in a computer program product having non-volatile memory therein, carrying computer executable instructions stored therein for generating a coded raster graphics image format representing surface data of a 3-dimensional object. The instructions include receiving a model or plurality of images of a 3-dimensional object to construct the model. The instructions include superposing an imaginary spherical surface over the object based on a reference point within the object. The imaginary spherical surface includes a front pole point and a back pole point. The instructions include mapping surface points of a front portion of the object using projection from the back pole point to form a first circular region at a tangent plane drawn at the front pole point. The front portion of the object is in a first hemisphere of the imaginary spherical surface. The surface points of a back portion of the object are mapped using projection from the front pole point to form a second circular region at a tangent plane drawn at the back pole point. The back portion of the object is in a second hemisphere of the imaginary spherical surface. The instructions further include encoding distance information of the surface points of the front portion and the back portion of the object from the reference point as greyscale values to obtain shape information of the front portion and back portion of the object. The encoded values are stored in the pixels of the first circular region and second circular region to form a first greyscale circular region and a second greyscale circular region in the raster graphics image. The color information of the corresponding surface points of the front portion and the back portion of the object are encoded as color values to obtain color information of the front portion and the back portion of the object. The encoded color values are stored in the pixels of a third circular region and fourth circular region in the raster graphics image. A coded image format is generated based on the raster graphics image, where the coded image format represents the surface data of the object.

In various embodiments, the computer program product having non-volatile memory therein, carrying computer executable instructions stored thereon for causing a device with a processor to read a coded image format representing surface data of a 3-dimensional object and render the object, is provided. The instructions cause the processor to receive a raster graphics image comprising a first circular region, a second circular region, a third circular region, a fourth circular region, and a metadata region, wherein each region represents surface data of the object. The instructions are further for decoding pixels in the metadata region to retrieve metadata associated with at least one of the raster graphics image and the object. The instructions further include decoding pixels of the first circular region and the second circular region to obtain 3D coordinates of the surface points in an initial reference axis system, wherein the 3D coordinates comprises a distance information and vector coordinates of surface points from a reference point in the object. Further, the instructions include decoding pixels of the third and fourth circular region to obtain the RGB color information. The instructions further cause transforming 3D coordinates of the surface points from the initial reference axis system to perspective 2D image coordinates and associated triangular surface elements of an output view. The instructions then cause calculating pixel data attributes within triangular surface elements by interpolation and updating pixel color based on distance information along the viewing direction to render the output view image.

Examples

Capturing Images of an Object of Interest (Rubik's Cube):

A Rubik's cube was placed at a center stage of the camera stand system as illustrated earlier in FIG. 2. The camera was fixed on the holder, which allows the camera to slide precisely along the circular member of the stand to navigate and cover a range of polar angles. The stage mounting the Rubik's cube was rotated about its vertical axis to vary the azimuth angle of view. Several photos were taken at different azimuth and polar angle values so as to cover the full solid angle spectrum. A minimum number of 6 digital photo shots to capture at least the front, back, left, right, top and bottom view were taken, while a higher number of photographs at in-between angles are needed for improved reliable image analysis of complex shapes. The images were processed to segment the object (Rubik's cube) from its background, and the resultant images along with its view angle parameters formed the input to the computer program to decipher the object model based on sculpt down and ray tracing algorithms.

Figure 5:
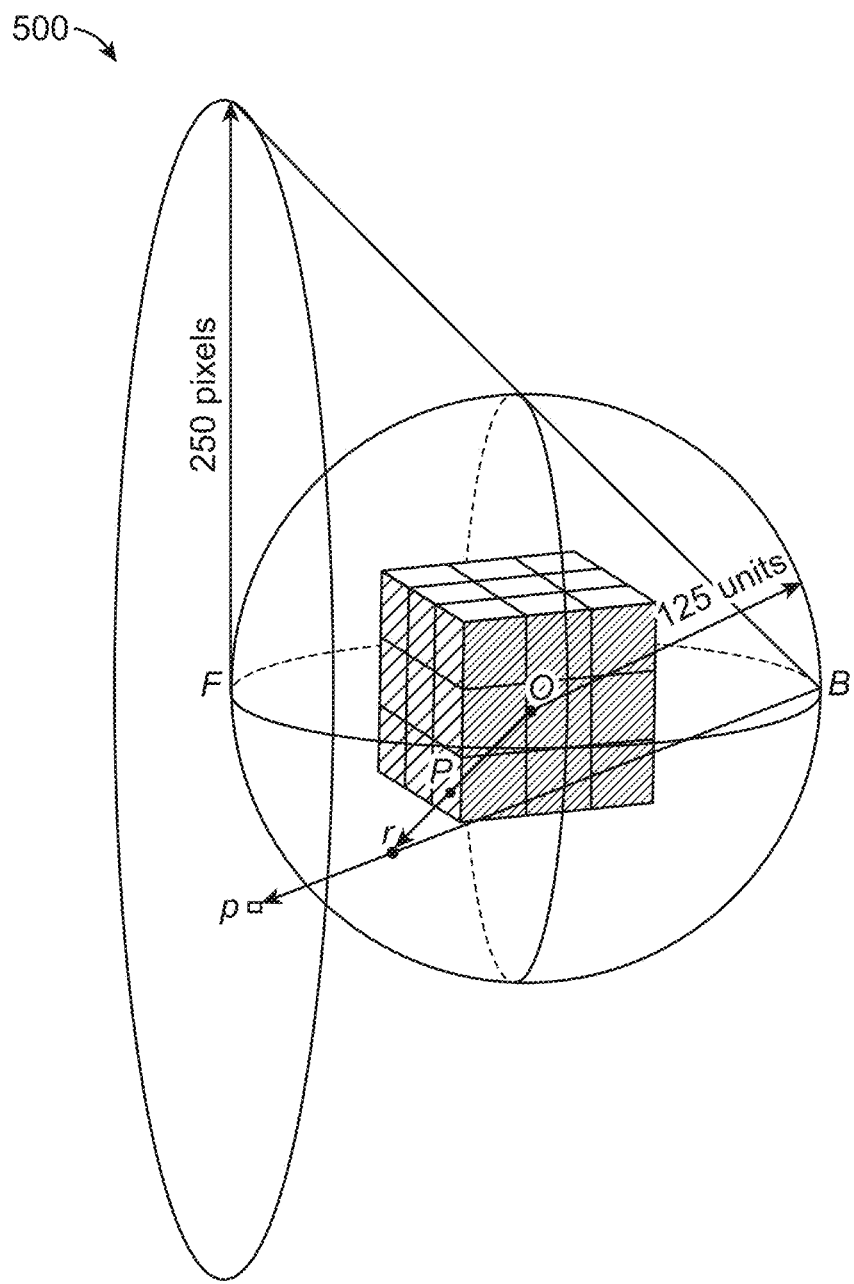
FIG. 5 illustrates a geometrical procedure for mapping the surface points of a 3-dimensional object, according to one example of the present subject matter.

Mapping Surface Points of the Object (Rubik's Cube):

A geometrical procedure for mapping the surface points of the Rubik's cube is illustrated in FIG. 5, according to an example of the present subject matter. The Rubik's cube has six colors—one each on the side of the cube. The various colors on each side of the Rubik's cube are represented by unique line patterns as shown in the figure. The imaginary sphere was constructed based on the reference point 'O', which is a centroid, within the cube. The imaginary spherical surface includes a front pole point F and a back pole point B. The back pole point B was used for stereographic projection of the front side hemisphere and to form a circular region at the tangent plane drawn at 'F'. In the figure, an arbitrary point labelled 'P' lying on the front portion of the object is shown. The direction vector 'OP' intersects the sphere surface at 'r', and extension of the line segment 'Br' intersects the tangent plane at 'p'. The pixel at point 'p' on first circular region indicates a greyscale value based on the distance "OP". For instance, the grey shade on the first circular region is proportional to the length "OP". The color information, i.e., the RGB values on the surface at P is encoded in the pixels at 'p' of third circular region. The points on the back-half plane side of 'O' are similarly mapped using 'F' pole point. In this way, all points on the object were mapped uniquely to a point on the planar circle at the front or back side. In the example, the radius of the sphere was 125 units that resulted in a planar circle of 250 pixel units and a final comprehensive image was a square array of size 1000×1000 pixels. If the maximum distance of the surface point (corner of the cube) from 'O' is M, then the distance 'OP' is multiplied by the factor 250/M, and this value was coded as the pixel of varying grey shade.

Figure 6:
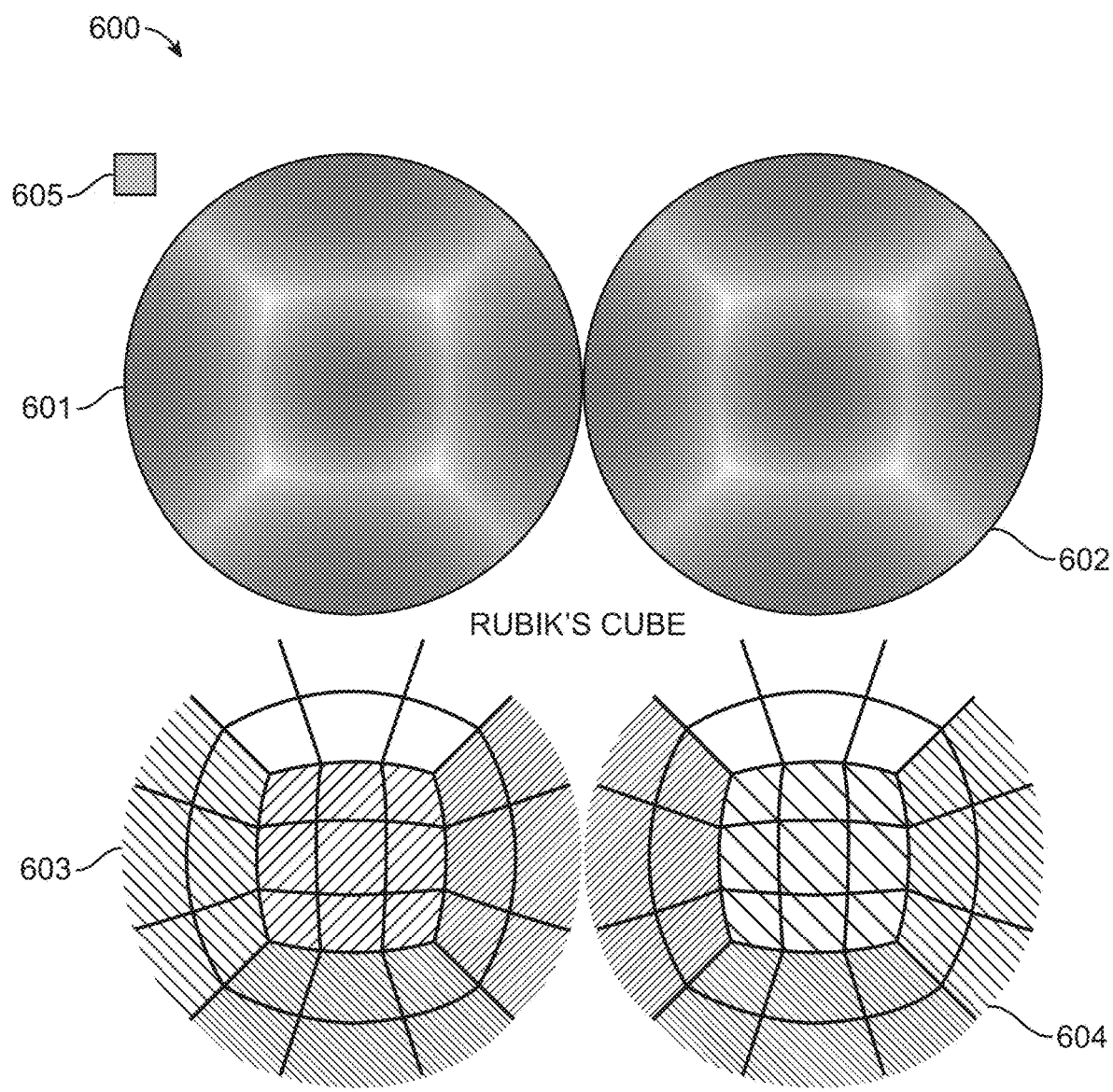
FIG. 6 illustrates a coded image format representing the shape and color information of the 3-dimensional object, according to one example of the present subject matter.
Figure 7:
FIG. 7 illustrates a coded image format representing of coin, according to another example of the present subject matter.

Object Representation in Coded Image Format:

A coded image format representing the shape and color information of the 3-dimensional object (Rubik's cube) is illustrated in FIG. 6, according to an example of the present subject matter. The coded image format was the resultant 1000×1000 pixel image for the Rubik's cube model object. The shape information of the object was thus coded in the grey colored circle zones located in the upper quadrants, i.e., in a first circular region 601 and second circular region 602. The color component (Red, Green, Blue) values of the corresponding surface points was stored in the two circles in the lower quadrant, i.e., in a third circular region 603 and fourth circular region 604. The pixel outside the four circle zones was white, and carries text labels and additional information of the object. The pixels 605 at the top left corner of the image were used to record the auxiliary details of the image for recognizing the adopted image coding format and other metadata. Further, a coded image format representing the shape and color information of real world object is illustrated in FIG. 7, according to another example of the present subject matter. As shown, the coded image format of a 10 rupee coin was generated. The distance information is represented at the first and second circular regions. The dark shade of grey indicates the narrow distance between the surface of the coin. The color information of the coin is illustrated in the third and fourth circular regions.

The above subject matter and its embodiments provide complete surface data of 3-dimensional objects. The methods and system described herein are reliable and efficient, and achieves a result that is simple and easy to interpret. The coded image format can enable a viewer to decipher the color, size, and shape of objects without the requirement of proprietary applications for decoding. Further, the present subject matter may be used in various fields, such as for educational purposes, laboratory or research purposes, engineering and manufacturing purposes, etc.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here.

While the invention has been disclosed with reference to certain embodiments, it will be understood by those skilled in the art that various changes may be made and equivalents may be substituted without departing from the scope of the invention.

What is claimed is:

1. A method of generating coded image format representing surface data of a 3-dimensional object, the method comprising:
   a. receiving a 3-dimensional model of the object;
   b. superposing an imaginary spherical surface over the object based on a reference point within the object, wherein the imaginary spherical surface comprises a front pole point and a back pole point;
   c. capturing surface data of the object through a standard solid angle discretization of the superposed imaginary sphere;
   d. mapping surface points of a front portion of the object using projection from the back pole point to form a first circular region at a tangent plane drawn at the front pole point, wherein the front portion of the object is in a first hemisphere of the imaginary spherical surface;
   e. mapping surface points of a back portion of the object using projection from the front pole point to form a second circular region at a tangent plane drawn at the back pole point, wherein the back portion of the object is in a second hemisphere of the imaginary spherical surface;
   f. encoding distance information of the surface points of the front portion and back portion of the object from the reference point as greyscale values to obtain the shape information of the front portion and the back portion of the object;
   g. storing the encoded greyscale values of the distance information of the surface points of the front portion in the pixels of the first circular region and the encoded greyscale values of the distance information of the surface points of the back portion in the pixels of the second circular region to form a first greyscale circular region and a second greyscale circular region in a raster graphics image;
   h. encoding color information of the surface points of the front portion and back portion of the object as color values to obtain color information of the front portion and the back portion of the object;
   i. storing the encoded color values in the pixels of a third circular region and fourth circular region in the raster graphics image; and
   j. generating a coded image format based on the raster graphics image, wherein the coded image format comprises:
      i. the first greyscale circular region in a first location;
      ii. the second greyscale circular region in a second location;
      iii. the third circular region in a third location;
      iv. the fourth circular region in a fourth location; and
      v. metadata in the regions outside the circular regions forming a white background.

2. The method of claim 1, wherein in step a., the method comprises:
   capturing a plurality of images of the 3-dimensional object at a plurality of orientations to obtain multiple views of the object, and processing the plurality of captured images by segmentation to extract a model of the object.

3. The method of claim 1, wherein the standard solid angle discretization of the superposed imaginary sphere, comprises $\pi N^2/8$ number of discretized surface points for a full size image of N×N pixels.

4. The method of claim 1, wherein the raster graphic image is decoded using a decoder application program to render the virtual image of the object from one or more viewing directions and at one or more viewing distances.

5. The method of claim 4, wherein the decoding comprises:
   retrieving set of spherical triangle unit elements ($\pi N^2/4$) comprising circular zone point and its horizontal, vertical adjacent points;
   forming the complete continuous envelope for linear or curvilinear interpolation of the surface; and
   tracing surface data of the object to obtain virtual image.

6. The method of claim 4, wherein the method comprises rendering an image from the coded image format, the method comprises:
   a. receiving the coded image format comprising the first greyscale circular region, the second greyscale circular region, the third circular region, the fourth circular region, and the metadata;
   b. decoding pixels comprising the metadata to retrieve metadata associated with the coded image format and the object;

c. decoding pixels of the first circular region and the second circular region to obtain 3D coordinates of the surface points in an initial reference axis system, wherein the 3D coordinates comprises a distance information from a reference point in the object;

d. decoding pixels of the third and fourth circular regions to obtain the RGB color information;

e. transforming 3D coordinates of the surface points from the initial reference axis system to perspective 2D image coordinates and associated triangular surface elements of an output view; and f. calculating pixel data attributes within triangular surface elements by interpolation and updating pixel color based on distance information along the viewing direction to render the output view image.

7. The method of claim 1, wherein encoding the distance information of each of the surface points of the front portion of the object from the reference point as a grey scale value or the back portion of the object from the reference point as a grey scale value is performed by linear scaling.

8. The method of claim 1, wherein mapping the surface points of the front or the back portion of the object is performed by a projection technique selected from stereographic projection or equal area projection.

9. The method of claim 1, wherein the object is a 3D object comprising a surface that exhibits non-transparent, non-specular outer surface, and a shape such that a line emanating from the reference point in any direction intersects the outer surface of the object at not more than one point.

10. The method of claim 1, wherein the metadata comprises one or more of marker length, marker units, annotation about the objects, annotation labels, description of object using ASCII conversion of text characters, image format version, encoding type, scale, or sequence of views of the object.

11. A computer program product having non-volatile memory therein, carrying computer executable instructions stored thereon for generating coded image format representing surface data of a 3-dimensional object, the instructions comprising:

a. receiving a 3-dimensional model of the object;

b. superposing an imaginary spherical surface over the object based on a reference point within the object, wherein the imaginary spherical surface comprises a front pole point and a back pole point;

c. mapping surface points of a front portion of the object using projection from the back pole point to form a first circular region at a tangent plane drawn at the front pole point, wherein the front portion of the object is in a first hemisphere of the imaginary spherical surface;

d. mapping surface points of a back portion of the object using projection from the front pole point to form a second circular region at a tangent plane drawn at the back pole point, wherein the back portion of the object is in a second hemisphere of the imaginary spherical surface;

e. encoding the distance information of the surface points of the front portion and back portion of the object from the reference point as greyscale values to obtain the shape information of the front portion and the back portion of the object;

f. storing the encoded values in the pixels of the first circular region and second circular region to form a first greyscale circular region and a second greyscale circular region in a raster graphics image;

g. encoding the color information of the surface points of the front portion and back portion of the object as color values to obtain color information of the front portion and the back portion of the object;

h. storing the encoded color values in the pixels of a third circular region and fourth circular region in the raster graphics image; and i. generating a coded image format based on the raster graphics image, wherein the coded image format represents the surface data of the object.

12. The computer program product of claim 11, wherein the coded image format comprises:

i. the first greyscale circular region in a first location;

ii. the second greyscale circular region in a second location;

iii. the third circular region in a third location;

iv. the fourth circular region in a fourth location; and v. metadata in the regions outside the circular regions forming a white background.

13. A computer program product having non-volatile memory therein, carrying computer executable instructions stored thereon for causing a device with a processor to read a coded image format representing surface data of a 3-dimensional object and render the object, the instructions causing the processor to:

a. receive a raster graphics image comprising a first circular region, a second circular region, a third circular region, a fourth circular region, and a metadata region, wherein each region represents surface data of the object;

b. decode pixels in the metadata region to retrieve metadata associated with at least one of the raster graphics image and the object;

c. decode pixels of the first circular region and the second circular region to obtain 3D coordinates of the surface points in an initial reference axis system, wherein the 3D coordinates comprise a distance information and vector coordinates of surface points from a reference point in the object;

d. decode pixels of the third and fourth circular region to obtain the RGB color information;

e. transform 3D coordinates of the surface points from the initial reference axis system to perspective 2D image coordinates and associated triangular surface elements of an output view; and f. calculate pixel data attributes within triangular surface elements by interpolation and updating pixel color based on distance information along the viewing direction to render the output view image.

14. A system for generating coded image format storing surface data of a 3-dimensional object, the system comprising one or more image capturing devices configured to capture one or more images of the 3-dimensional object in different heights, angles and orientations, a memory unit, a processing unit coupled to the memory unit and configured to process the one or more captured images and a display device configured to render a virtual image of the object viewable from one or more directions and one or more distances, characterized in that the processing unit is configured to:

i. receive a model or a plurality of images of a 3-dimensional object;

ii. superpose an imaginary spherical surface over the object based on a reference point within the object, wherein the imaginary spherical surface comprises a front pole point and a back pole point;

iii. map surface points of the front portion of the object using projection from the back pole point to form a first circular region at a tangent plane drawn at the front pole point, wherein the front portion of the object is in a first hemisphere of the imaginary spherical surface;

iv. map surface points of the back portion of the object using projection from the front pole point to form a second circular region at a tangent plane drawn at the back pole point, wherein the back portion of the object is in a second hemisphere of the imaginary spherical surface;

v. encode the distance information of each of the surface points of the front portion and back portion of the object from the reference point as a greyscale value to obtain the shape information of the front portion and the back portion of the object;

vi. store the encoded values in the pixels of the first circular region and second circular region to form a first greyscale circular region and a second greyscale circular region in a raster graphics image;

vii. encode the color information of the surface points of the front portion and back portion of the object as color values;

viii. store the encoded color values in the pixels of a third circular region and a fourth circular region in the raster graphics image; and ix. generate a coded image format based on the raster graphics image, comprising
  a. the first greyscale circular region in a first location;
  b. the second greyscale circular region in a second location;
  c. the third circular region in a third location;
  d. the fourth circular region in a fourth location; and
  e. metadata in the regions outside the circular regions forming a white background.

15. The system of claim 14, wherein the processing unit is configured to:
  read the coded image format using a decoder application program to render the virtual image of the object from one or more viewing directions and at one or more viewing distances.

16. The system of claim 14, wherein the system comprises: a display device configured to render a virtual image of the object viewable from one or more directions and one or more distances.

17. The system of claim 14, wherein the distance information of each of the surface points of the front portion of the object from the reference point or the back portion of the object from the reference point is encoded as a grey scale value by linear scaling.

18. The system of claim 14, wherein the surface points of the front portion or back portion of the object is mapped by a projection technique selected from stereographic projection, lambert projection or equal area projection.

19. The system of claim 14, wherein the object is a 3D object comprising a surface that exhibits non-transparent, non-specular character, and comprises a specific color assigned to each surface point.

20. The system of claim 14, wherein the processing unit is configured to record the metadata of the object comprising one or more of marker length, marker units, annotation marks, annotation labels, description of object using ASCII conversion of text characters and store the grey pixel value.

21. The system of claim 14, further comprising an image capturing device configured to capture a plurality of images of a 3-dimensional object.

22. The system of claim 14, wherein the processing unit is configured to process the plurality of captured images to extract objects.

* * * * *